Figure 1:
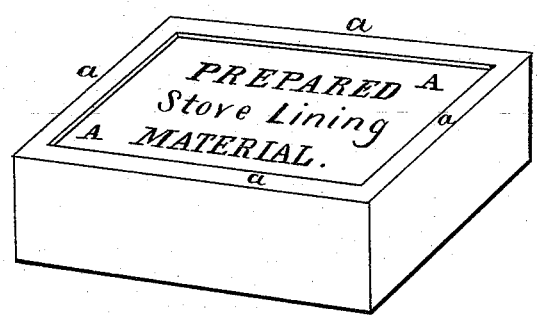
Figure 2:
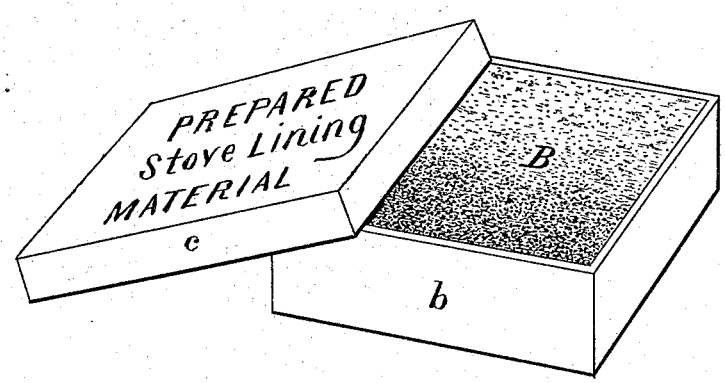

L. R. WITHERELL.
Composition for Lining and Repairing Stoves.

No. 157,955.            Patented Dec. 22, 1874.

Witnesses:
F. G. Daniels
Henry Daniels

Inventor:
Loren R. Witherell,
by Louis Bagger
Attorney.

UNITED STATES PATENT OFFICE.

LOREN R. WITHERELL, OF DAVENPORT, IOWA, ASSIGNOR TO DAVID W. SICKELS, OF MOLINE, ILLINOIS.

IMPROVEMENT IN COMPOSITIONS FOR LINING AND REPAIRING STOVES.

Specification forming part of Letters Patent No. 157,955, dated December 22, 1874; application filed August 13, 1874.

*To all whom it may concern:*

Be it known that I, LOREN R. WITHERELL, of Davenport, in the county of Scott and State of Iowa, have invented a new and useful Improvement in Stove-Lining Material; and I do hereby declare that the following is a full and exact description thereof, which will enable those skilled in the art to which it pertains to make and use the same, reference being had to the accompanying drawing forming part of this specification.

This invention relates to an improvement in argillaceous material for "fire-clay;" and consists in mixing and preparing the best combinations for withstanding the heat without shrinking or cracking, and pulverizing it into a powder suitable for shipment and sale in sacks, boxes, or barrels, as hereinafter more fully set forth.

The prepared article, packed in a box, is represented on the drawing, in which B denotes the dried and pulverized stove-lining material. $b$ denotes the box, and $c$ is the cover of the box with its label. In this form the material is ready for immediate use, by simply moistening and applying to the defective part of the stove, or for lining new stoves or replacing old lining, in the form of a thick, plastic cement.

My improved stove-lining is prepared by mixing native or clear fire-clay with burnt fire-clay, or any suitable substance that will prevent it from shrinking too much, and drying and pulverizing this compound into a coarse powder, suitable for packing in boxes, as shown. It may sometimes be found preferable not to pulverize this mass, however, but, after mixing and wetting, (if necessary,) mold it into bricks or blocks, suitably stamped or labeled, in the same manner as artificial "bath-brick," and other similar material. When the lining is to be used in this form, a representation of which is shown in Fig. 1 of the drawing, a sufficiently-large piece is broken from the block, and put into the water until dissolved into a thick plastic cement, when it is applied in like manner as powder, by plastering upon the stove.

I am aware that fire-clay, in the neighborhood of potteries, has been used to a limited extent for lining and repairing stoves; but as it was available only in a few localities, and as but few people understood how to use it with satisfactory results, even when it could be obtained, it was comparatively worthless and unused.

Having thus described my invention, I claim and desire to secure by Letters Patent—

As a new article of manufacture, a stove-lining material consisting of native or clear fire-clay mixed with burnt and powdered fire-clay, and molded into blocks, substantially as and for the purpose specified.

LOREN R. WITHERELL.

Witnesses:
DAVID W. SICKELS,
ALFRED DUNN.